(12) United States Patent
Llopis

(10) Patent No.: US 12,721,467 B2
(45) Date of Patent: Sep. 1, 2026

(54) MACHINE AND METHOD FOR PRODUCING AND DELIVERING COFFEE-BASED BEVERAGES

(71) Applicant: Sanremo Coffee Machines S.R.L., Carbonera (IT)

(72) Inventor: Danilo Llopis, Carbonera (IT)

(73) Assignee: Sanremo Coffee Machines S.R.L., Carbonera (IT)

( * ) Notice: Subject to any disclaimer, the term of this patent is extended or adjusted under 35 U.S.C. 154(b) by 1146 days.

(21) Appl. No.: 17/769,577

(22) PCT Filed: Sep. 28, 2020

(86) PCT No.: PCT/IT2020/050233
§ 371 (c)(1),
(2) Date: Apr. 15, 2022

(87) PCT Pub. No.: WO2021/074936
PCT Pub. Date: Apr. 22, 2021

(65) Prior Publication Data

US 2024/0115068 A1 Apr. 11, 2024

(30) Foreign Application Priority Data

Oct. 16, 2019 (IT) ........................ 102019000019109

(51) Int. Cl.
*A47J 31/36* (2006.01)
*A47J 31/44* (2006.01)
(Continued)

(52) U.S. Cl.
CPC ............. *A47J 31/36* (2013.01); *A47J 31/446* (2013.01); *A47J 31/468* (2018.08); *A47J 31/5251* (2018.08); *A47J 31/5253* (2018.08)

(58) Field of Classification Search
CPC ........ A47J 31/36; A47J 31/446; A47J 31/468; A47J 31/5253; A47J 31/469; A47J 31/52;
(Continued)

(56) References Cited

U.S. PATENT DOCUMENTS 5,632,449 A 5/1997 Sandolo
5,690,283 A 11/1997 Sandolo
(Continued)

FOREIGN PATENT DOCUMENTS

EP 2314183 A1 * 4/2011 .......... A47J 31/5255
EP 3430951 A1 1/2019
(Continued)

OTHER PUBLICATIONS

Sanremo Coffee Machines S.R.L., International Patent Application PCT/IT2020/050233, International Search Report and Written Opinion Mailed Nov. 19, 2020, 8 pp.
(Continued)

*Primary Examiner* — Phuong T Nguyen
(74) *Attorney, Agent, or Firm* — PCFB, LLC; Justin K. Flanagan

(57) ABSTRACT

A machine is described, for producing and delivering coffee-based beverages comprising: a heating boiler (1); a delivering assembly (3) comprising a solenoid valve (8) and second means for heating (7) and controlling (4) the water temperature; a filter-holder (5) removably connectable to the delivering assembly (3), comprising a filter (6) in which the powder of ground coffee is pressed; a hydraulic pump (2) for delivering water from the delivering assembly (3) through the powder of ground coffee, and connected to the heating boiler (1) and to the delivering assembly (3); a first pressure sensor (21) to detect the water delivery pressure and regulate the flow-rate of water depending on the pressure value detected by a second pressure sensor (26) arranged next to
(Continued)

the solenoid valve (8) to measure the counter-pressure exerted by the powder of ground coffee.

7 Claims, 1 Drawing Sheet

(51) Int. Cl.
*A47J 31/46* (2006.01)
*A47J 31/52* (2006.01)

(58) Field of Classification Search
CPC ...... A47J 31/5251; A47J 31/525; A47J 31/46; A47J 31/02; A47J 31/4482; A47J 31/4485; A47J 31/60; A47J 31/061; A47J 45/10; A47J 36/10; A47J 31/38; A47J 31/461; A47J 31/005; A47J 31/0663; A47J 31/0684; A47J 31/3671; B05B 5/006
USPC ........................... 99/279, 287, 290, 293, 295
See application file for complete search history.

(56) References Cited

U.S. PATENT DOCUMENTS

2016/0278569 A1* 9/2016 Coccia .................... A47J 31/36
2017/0367537 A1 12/2017 Illy
2018/0042258 A1* 2/2018 Roberts ............... A47J 31/0615
2018/0296037 A1 10/2018 Tseng

FOREIGN PATENT DOCUMENTS

WO 2015056241 A1 4/2015
WO WO-2015055343 A1 * 4/2015 ............ A47J 31/469
WO 2015124592 A1 8/2015
WO 2021074935 A1 4/2021

OTHER PUBLICATIONS

Sanremo Coffee Machines S.R.L., International Patent Application PCT/IT2020/050232, International Search Report and Written Opinion Mailed Jan. 22, 2021, 9 pp.

* cited by examiner

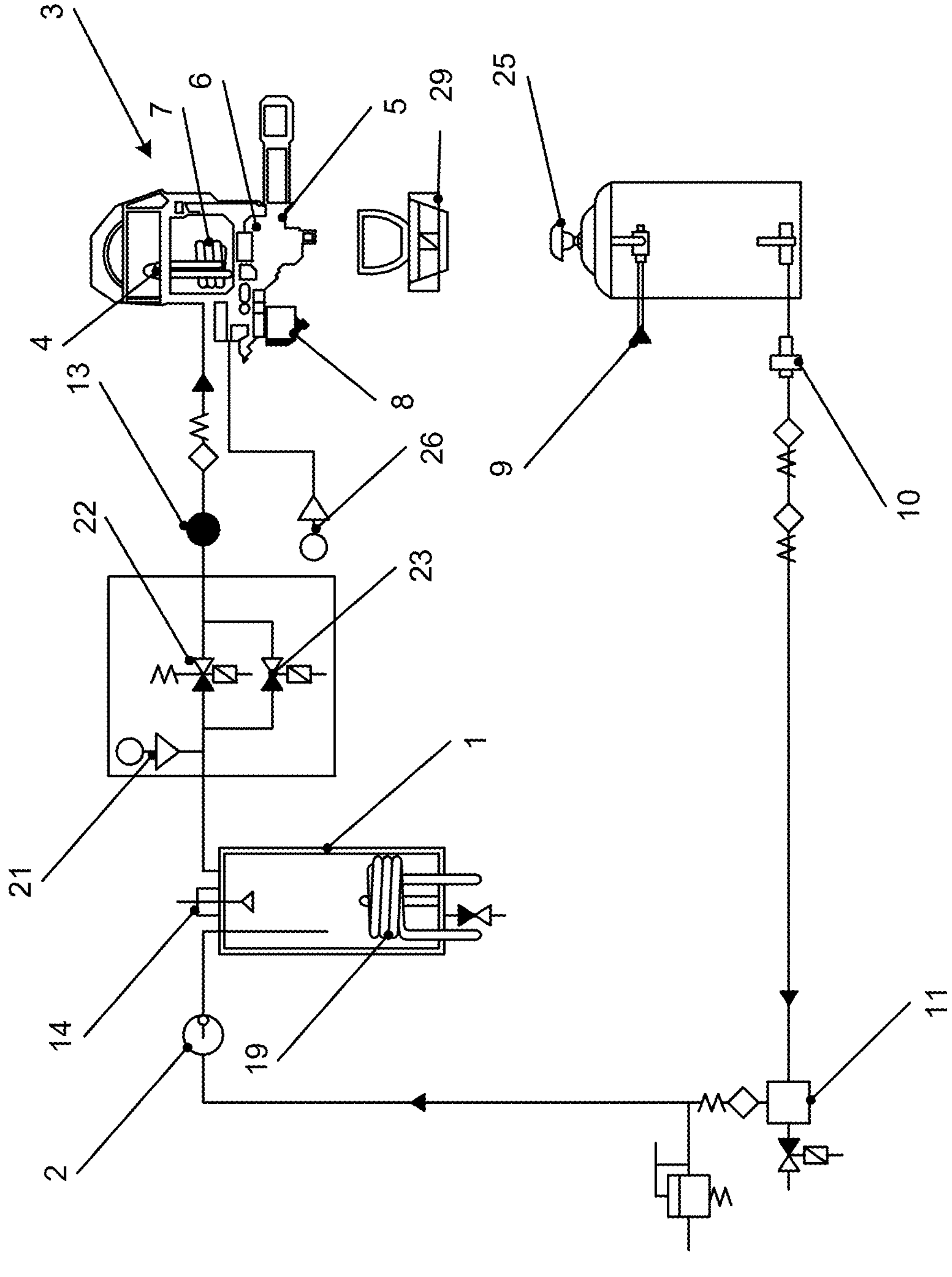
3
7
6
5
29
25
4
13
8
26
9
10
22
23
1
21
14
19
11
2

MACHINE AND METHOD FOR PRODUCING AND DELIVERING COFFEE-BASED BEVERAGES

CROSS-REFERENCE TO RELATED APPLICATIONS

This application is a national phase entry under 35 U.S.C. § 371 of International Patent Application PCT/IT/2020/050233, filed Sep. 28, 2020, designating the United States of America and published in English as International Patent Publication WO 2021/074936 on Apr. 22, 2021 for "MACHINE AND METHOD FOR PRODUCING AND DELIVERING COFFEE-BASED BEVERAGES," which claims priority to Italian Patent Application No. 102019000019109 filed on Oct. 16, 2019, the disclosures of both of which are hereby incorporated herein in their entireties by this reference.

TECHNICAL FIELD

The present invention refers to a machine and to a method for producing and delivering coffee-based beverages.

BACKGROUND

Machines for producing and delivering coffee-based beverages are known in the art, in particular for the professional sector, such as bars, restaurants, hotels and catering, which comprise a hydraulic circuit comprising a boiler, a pump, a delivering assembly for hot water to which a filter-holder is associated, comprising a filter in which the ground coffee is placed and pressed.

The ground coffee is pressed in the filter of the filter-holder, which in turn is fastened to the delivering assembly, and then the pump delivering hot water is actuated, thereby obtaining the infusion.

The obtained coffee can change in its organoleptic characteristics depending, for example, on the amount of used ground coffee, on the grinding degree, on the entity of used pressure, on the time in which water is delivered.

In order to control the organoleptic characteristics of the obtained beverage, known machines for producing and delivering coffee-based beverages comprise a pressure sensor arranged along the hydraulic circuit, to detect a value of water delivery pressure; depending on this detected pressure value, the flow-rate of water delivered by the machine is regulated, for example varying the flow-rate of water delivered by the pump or through a valve with adjustable flow-rate, or varying the delivering time.

Such solutions are based on the control of the water flow-rate which crosses the hydraulic circuit, and have difficulties in obtaining an optimum infusion, keeping constant in time the organoleptic characteristics of the beverage obtained in the cup, with the only measure of the water pressure in the hydraulic circuit, or of the water delivering time.

SUMMARY

Object of the present invention is solving the above prior art problems, by providing a machine and a method for producing and delivering coffee-based beverages which allow obtaining an optimum infusion, guaranteeing the repeatability of the infusion in time, so that it can be simply and easily obtained by an operator.

Another object of the invention is providing a machine and a method for producing and delivering coffee-based beverages which allow delivering infusions which have constant organoleptic characteristics in time, keeping the quality of the beverage obtained in the cup constant.

The above and other objects and advantages of the invention, as will result from the following description, are obtained with a machine and a method for producing and delivering coffee-based beverages as claimed in the independent claims. Preferred embodiments and non-trivial variations of the present invention are the subject matter of the dependent claims.

It is intended that all enclosed claims are an integral part of the present description.

It will be immediately obvious that numerous variations and modifications (for example related to shape, sizes, arrangements and parts with equivalent functionality) can be made to what is described, without departing from the scope of the invention as included in the enclosed claims.

BRIEF DESCRIPTION OF THE DRAWINGS

The present invention will be better described by some preferred embodiments thereof, provided as a non-limiting example, with reference to the enclosed drawings, in which:

FIG. 1 is a block diagram schematic view of the hydraulic network of the machine for producing and delivering coffee-based beverages according to the present invention.

DETAILED DESCRIPTION

With reference to FIG. 1, a preferred embodiment of the machine for producing and delivering coffee-based beverages according to the present invention is shown and described, which comprises: a heating boiler 1 comprising first means for heating 19 and controlling 14 the water temperature, for example a temperature sensor 14 and a resistance heater 19; an hydraulic pump 2; a delivering assembly 3 comprising a solenoid valve 8, and second means for heating 7 and controlling 4 the water temperature, for example a temperature sensor 4 and a resistance heater 7, for heating the water; a filter-holder 5 removably connectable to the delivering assembly 3, comprising a filter 6 in which the powder of ground coffee is pressed.

The hydraulic pump 2 is configured for delivering water from the delivering assembly 3, through the powder of ground coffee contained in the filter 6 of the filter-holder 5, in the necessary amount to obtain a cup of expresso coffee, and is connected in fluid communication through an hydraulic circuit to the heating boiler 1 and to the delivering assembly 3.

The machine for producing and delivering coffee-based beverages of the invention comprises, in a preferred way, a first pressure sensor 21 arranged along the hydraulic circuit, preferably between the heating boiler 1 and the delivering assembly 3, and a volumetric meter 13 to manage the amount of delivered coffee and detect a value of water volume and delivery pressure and regulate the flow-rate of water emitted by means for regulating the flow-rate 22 depending on the pressure value detected by a second pressure sensor 26 arranged next to the solenoid valve 8 and configured to measure the counter-pressure exerted by the powder of ground coffee contained in the filter 6.

The means for regulating the flow-rate 22, for example a regulating valve 22 with variable and adjustable flow-rate, preferably an electronically controlled proportional solenoid valve or a manifold solenoid valve, are arranged in a manifold along the hydraulic circuit, preferably between the heating boiler 1 and the delivering assembly 3, to regulate the flow-rate and the pressure of water emitted by the regulating valve 22 and delivered by the delivering assembly 3 depending on the value detected by the second pressure sensor 26.

The heating boiler 1 is supplied through the hydraulic network 9 by interposing a sweetener 25, a filter 10 and a manifold 11 whose function is dispensing the network water in the hydraulic circuit.

The boiler 1 is further connected to the delivering assembly 3 through the volumetric meter 13, and the hydraulic circuit preferably comprises a valve 23, for example a solenoid valve inserted in the hydraulic circuit in parallel with the regulating valve 22.

The machine for producing and delivering coffee-based beverages of the invention further comprises a control unit which is configured for controlling the boiler 1, the hydraulic pump 2, the volumetric meter 13, the manifold 11 and the solenoid valve 8, connected thereto, to control the thermal power of the boiler and of the delivering assembly 3.

The control unit is further configured for controlling the first pressure sensor 21 and the second pressure sensor 26, the means for regulating the flow-rate 22, and in general the solenoid valves 23, 8 of the hydraulic circuit and of the regulating assembly 3 connected thereto, to regulate the flow-rate of water delivered by the regulating assembly 3.

The control unit is further configured to manage, with a suitable logarithm, the step of extracting the delivered coffee, in particular the volume and pressure of the delivered water, depending on the weight of the product delivered in a cup detected through a weighing system 29, and/or the pressure detected by the first 21 and/or the second 26 pressure sensor.

The method for producing and delivering coffee-based beverages of the invention comprises the steps of:

- rising the water temperature, inside the heating boiler 1 and inside the delivering assembly 3, through the heating 19, 7 and controlling 14, 4 means to obtain a water heating in order to regulate the delivered thermal power;
- a step of delivering water from the delivering assembly 3, in order to obtain an infusion of the powder of ground coffee pressed in the filter 6 contained in the filter-holder 5, wherein, through the control unit which manages the flow-rate of water delivered through the means for regulating the flow-rate 22, the amount in volume of water necessary to obtain a dose of the delivered product is delivered by the delivering assembly 3, depending on the pressure value detected by means of the second pressure sensor 26 in the delivering assembly 3.

Advantageously, the machine and the method for producing and delivering coffee-based beverages of the invention allow obtaining an optimum infusion, keeping constant in time the organoleptic characteristics of the beverage obtained in the cup, regulating the amount of delivered water to obtain a dose of the product, depending on the value of the pressure exerted on the powder of ground coffee contained in the filter.

The invention claimed is:

1. A machine for producing and delivering coffee-based beverages comprising:

- a heating boiler comprising first means for heating and controlling a water temperature;
- a delivering assembly comprising a solenoid valve and second means for heating and controlling the water temperature for heating water;
- a filter-holder removably connectable to the delivering assembly, comprising a filter in which the powder of ground coffee is pressed;
- a hydraulic pump configured for delivering water from the delivering assembly through the pressed powder of ground coffee contained in the filter of the filter-holder, and connected in fluid communication through a hydraulic circuit to the heating boiler and to the delivering assembly; and
- a first pressure sensor arranged along the hydraulic circuit to detect a delivery pressure of the water supplied by the hydraulic pump,
- wherein the flow-rate of water delivered by the pump is varied based on the delivery pressure detected by the first pressure sensor;
- a second pressure sensor that is hydraulically connected between the solenoid valve and the filter-holder, the second pressure sensor being configured to measure a counter-pressure exerted by the pressed powder of ground coffee in the filter; and
- an electronically controlled regulating valve to regulate the flow-rate of water from the hydraulic pump delivered by the delivering assembly based on (i) the delivery pressure measured by the first pressure sensor and (ii) the counter-pressure measured by the second pressure sensor,
- such that, during beverage preparation, the measured counter-pressure exerted by the powder of ground coffee contained in the filter is controlled, as well as the flow rate of water delivered by the hydraulic pump.

2. The machine of claim 1, wherein the regulating valve is part of a means for regulating the flow-rate arranged in a manifold along the hydraulic circuit to regulate flow-rate and pressure of water delivered by the delivering assembly depending on the counter-pressure measured by the second pressure sensor.

3. The machine of claim 1, wherein the regulating valve has a variable and adjustable flow-rate and is arranged between the heating boiler and the delivering assembly.

4. The machine of claim 3, wherein the regulating valve with adjustable flow-rate is an electronically controlled proportional solenoid valve.

5. The machine of claim 1, wherein the heating boiler is supplied through the hydraulic network by interposing a sweetener, a filter and a manifold whose function is dispensing the network water in the hydraulic circuit.

6. The machine of claim 1, wherein the heating boiler is connected to the delivering assembly through a volumetric meter to manage an amount of delivered coffee.

7. A method for producing and delivering coffee-based beverages with a machine according to claim 1, wherein the method comprises the steps of:

- raising the water temperature, inside the heating boiler and inside the delivering assembly to regulate delivered thermal power; and
- a step of delivering water from the delivering assembly, in order to obtain an infusion of the powder of ground coffee pressed in the filter contained in the filter-holder by regulating the flow-rate of water delivered through the regulating valve to obtain a dose of the coffee-based beverage based on the counter-pressure measured by the second pressure sensor.

* * * * *